United States Patent
Hisano et al.

(10) Patent No.: US 11,296,799 B2
(45) Date of Patent: Apr. 5, 2022

(54) OPTICAL TRANSMISSION SYSTEM AND BANDWIDTH ALLOCATION METHOD

(71) Applicant: NIPPON TELEGRAPH AND TELEPHONE CORPORATION, Tokyo (JP)

(72) Inventors: Daisuke Hisano, Yokosuka (JP); Tatsuya Shimada, Yokosuka (JP); Hiroshi Ou, Yokosuka (JP); Hiroko Nomura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 592 days.

(21) Appl. No.: 16/330,605

(22) PCT Filed: Sep. 8, 2017

(86) PCT No.: PCT/JP2017/032462
§ 371 (c)(1),
(2) Date: Mar. 5, 2019

(87) PCT Pub. No.: WO2018/047942
PCT Pub. Date: Mar. 15, 2018

(65) Prior Publication Data
US 2021/0288723 A1    Sep. 16, 2021

(30) Foreign Application Priority Data
Sep. 9, 2016 (JP) .............................. JP2016-176764

(51) Int. Cl.
*H04B 10/079* (2013.01)
*H04L 5/00* (2006.01)
(Continued)

(52) U.S. Cl.
CPC ....... *H04B 10/6932* (2013.01); *H04B 10/079* (2013.01); *H04L 5/0007* (2013.01);
(Continued)

(58) Field of Classification Search
CPC . H04B 10/6932; H04B 10/079; H04L 5/0007; H04L 5/0035; H04L 5/0048; H04L 27/2602
See application file for complete search history.

(56) References Cited

U.S. PATENT DOCUMENTS

2002/0136170 A1*  9/2002  Struhsaker ............ H04L 12/403
                                                     370/280
2019/0356406 A1* 11/2019  Doo ..................... H04J 14/0245

FOREIGN PATENT DOCUMENTS

| JP | 2015-207935 A | 11/2015 |
|---|---|---|
| JP | 2016-146585 A | 8/2016 |
| JP | 2017-017460 A | 1/2017 |

OTHER PUBLICATIONS

H. Yasuda et al., "Realization Method of Moving Cell for 5G Future Radio Access Network", IEICE, RCS2014-3, Apr. 2014 (with partial translation).
(Continued)

*Primary Examiner* — Ted M Wang
(74) *Attorney, Agent, or Firm* — Harness, Dickey & Pierce, P.L.C.

(57) ABSTRACT

An optical transmission system includes ground stations; optical-terminating devices; a traffic-monitoring unit that detects a traffic amount of the uplink signal transmitted in a time-division multiplexing manner for each of the optical-terminating devices; and a bandwidth allocation calculation unit that estimates one optical-terminating device of the optical-terminating devices connected to one ground station of the ground stations having a cell where the moving object is positioned on the basis of the traffic amount, and calcu-
(Continued)

lates a first allocation amount of a bandwidth allocated to the uplink signal of the one optical-terminating device connected to the one ground station having the cell where the moving object is positioned and a second allocation amount of a bandwidth allocated to the uplink signal of another optical-terminating device of the optical-terminating devices connected to another ground station of the ground stations having a cell adjacent to the cell where the moving object is positioned.

7 Claims, 11 Drawing Sheets

(51) Int. Cl.
  *H04B 10/69* (2013.01)
  *H04L 27/26* (2006.01)
(52) U.S. Cl.
  CPC .......... *H04L 5/0035* (2013.01); *H04L 5/0048* (2013.01); *H04L 27/2602* (2013.01)

(56) References Cited

OTHER PUBLICATIONS

T. Tashiro et al., "A Novel DBA Scheme for TDM-PON based Mobile Fronthaul", Proc. OFC2014, Tu3F.3, Mar. 2014.
International Search Report for International Patent Application No. PCT/JP2017/032462 (in Japanese), dated Oct. 31, 2017 with English translation thereof.
Lee, Seungjin et al., "RoFcell-cluster architecture in WDM/TDM hybrid-PON for train communication system", Optical Internet 2008. COIN 2008. 7th International Conference on, IEEE, Piscataway, NJ, USA, Oct. 14, 2008, pp. 1-2. XP031417925, ISBN: 978-4-88552-230-7.
Extended European Search Report from counterpart EP178488805, dated Apr. 16, 2020.

* cited by examiner

OPTICAL TRANSMISSION SYSTEM AND BANDWIDTH ALLOCATION METHOD

CROSS-REFERENCE TO RELATED APPLICATIONS

This application is a 371 U.S. National Stage of International Application No. PCT/JP2017/032462, filed on Sep. 8, 2017, which claims priority to Japanese Application No. 2016-176764, filed on Sep. 9, 2016. The entire disclosures of the above applications are incorporated herein by reference.

TECHNICAL FIELD

The present invention relates to an optical transmission system and a bandwidth allocation method.

Priority is claimed on Japanese Patent Application No. 2016-176764, filed Sep. 9, 2016, the content of which is incorporated herein by reference.

BACKGROUND ART

In mobile networks, a wireless base station (hereinafter, referred to as a "ground station") installed on the ground communicates with a mobile wireless terminal such as a cellular phone or a smartphone. It has been examined that a wireless base station (hereinafter, referred to as a "moving object installation station") installed on a moving object such as a bus or a train aggregates communication of mobile wireless terminals that move with the moving object (see Non-Patent Literature 1). The moving object installation station transmits the uplink signal (uplink frame) of mobile wireless terminals to a ground station, on behalf of the mobile wireless terminals that move with the moving object. A ground station having acquired the uplink signal from the moving object installation station transmits the uplink signal to a higher-level device of a mobile network through an optical network having optical devices and optical fibers.

FIG. 9 is a diagram illustrating a configuration example of an optical transmission system of the related art. In the optical transmission system of the related art, an optical fiber is installed for each ground station. In a case where a moving object is not positioned (located) within a cell of a ground station, the ground station does not transmit an uplink signal to a higher-level device, thereby leading to low bandwidth utilization efficiency of an optical network.

In a case where a plurality of ground stations share an optical network between each of the ground stations and the higher-level device, the bandwidth utilization efficiency of the optical network improves. In a case where the bandwidth utilization efficiency of the optical network improves, the optical transmission system makes it possible for construction costs for the optical fiber to be reduced. An example of the optical network shared by a plurality of ground stations includes a time division multiplexer-passive optical network (TDM-PON) (see Non-Patent Literature 2).

CITATION LIST

Non-Patent Literature

[Non-Patent Literature 1]
Hiroto Yasuda, Yasufumi Morioka, Yoshifumi Morihiro, Satoshi Suyama, Jiyun Shen, and Yukihiko Okumura, "Realization Method of Moving Cell for 5G Future Radio Access Network", IEICE Technical Report, RCS2014-3, April, 2014

[Non-Patent Literature 2]
T. Tashiro, S. Kuwano, J. Terada, T. Kawamura, N. Tanaka, S. Shigematsu, and N. Yoshimoto, "A Novel DBA Scheme for TDM-PON based Mobile Fronthaul", Proc. OFC 2014, Tu3F.3, March 2014.

SUMMARY OF INVENTION

Technical Problem

As an example, a case where the number of optical-terminating devices (optical network units) (ONUs) connected to each ground station is ten will be described. Ten ONUs communicate with a terminal station device (optical line terminal) (OLT) through a shared TDM-PON. In a case where the OLT allocates a static bandwidth to the uplink signal of each of the ONUs, the maximum throughput of the uplink signal of the ONUs is 1 Gbps in a case of not considering overhead.

FIG. 10 is a diagram illustrating a configuration example of an OLT of the related art. The OLT of the related art includes an optical/electrical (O/E) conversion unit, an uplink frame-processing unit, a bandwidth allocation calculation unit, a bandwidth allocation unit, a downlink frame-processing unit and an electrical/optical (E/O) conversion unit.

The O/E conversion unit acquires an uplink signal which is an optical signal from an ONU. The O/E conversion unit converts the uplink signal which is an optical signal into an electrical signal. The O/E conversion unit transmits the uplink signal which is an electrical signal to the uplink frame-processing unit. The uplink frame-processing unit extracts a signal (hereinafter, referred to as a "request signal") for requesting the bandwidth allocation amount of the uplink signal from the uplink signal. The uplink frame-processing unit transmits the request signal to the bandwidth allocation calculation unit.

The bandwidth allocation calculation unit calculates the bandwidth allocation amount of the uplink signal on the basis of the request signal. The bandwidth allocation unit allocates a bandwidth to the uplink signal of each ONU on the basis of the bandwidth allocation amount of the uplink signal. The downlink frame-processing unit transmits information (hereinafter, referred to as "bandwidth allocation information") indicating bandwidth allocation of an uplink signal to the E/O conversion unit. The E/O conversion unit converts the bandwidth allocation information into an optical signal. The E/O conversion unit transmits the optical signal indicating the bandwidth allocation information to the ONUs.

FIG. 11 is a diagram illustrating an example of a bandwidth allocation method of the related art. The OLT transmits a gate signal to the ONU. The ONU generates a request signal on the basis of the traffic amount (data amount) of an uplink signal queued in the transmission buffer of the ONU. The ONU transmits an optical signal indicating the request signal to the OLT. In a case where a bandwidth is dynamically allocated on the basis of the queued data amount, a delay occurs in the transmission of the uplink signal.

In a case where the OLT dynamically allocates a bandwidth to the uplink signal of each ONU using the bandwidth allocation method of the related art, bandwidth utilization efficiency improves. As described above, a delay occurs in the transmission of the uplink signal of a mobile wireless terminal, thereby decreasing throughput. On the other hand, in a case where each of ground stations and a higher-level device are connected to each other in a TDM-PON and a bandwidth is statically allocated to each of the ground stations, bandwidth utilization efficiency and throughput decrease and a problem occurs.

In view of such circumstances, an object of the present invention is to provide an optical transmission system and a bandwidth allocation method that make it possible to avoid decreases of bandwidth utilization efficiency and throughput without additional delay even in a case where each of ground stations and a higher-level device are connected to each other in a TDM-PON and a bandwidth is dynamically allocated to each ground station.

Solution to Problem

According to a first aspect of the present invention, an optical transmission system is provided, including: a plurality of ground stations, each acquiring an uplink signal from a wireless base station of a moving object which is positioned in an own cell; a plurality of optical-terminating devices that transmit the uplink signal acquired from the plurality of ground stations in a time-division multiplexing manner; a traffic-monitoring unit that detects a traffic amount of the uplink signal transmitted in a time-division multiplexing manner for each of the plurality of optical-terminating devices; and a bandwidth allocation calculation unit that estimates one optical-terminating device of the plurality of optical-terminating devices connected to one ground station of the plurality of ground stations having a cell where the moving object is positioned on the basis of the traffic amount, and calculates a first allocation amount of a bandwidth allocated to the uplink signal of the one optical-terminating device connected to the one ground station having the cell where the moving object is positioned and a second allocation amount of a bandwidth allocated to the uplink signal of another optical-terminating device of the plurality of optical-terminating devices connected to another ground station of the plurality of ground stations having a cell adjacent to the cell where the moving object is positioned.

According to a second aspect of the present invention, the optical transmission system of the first aspect further includes: a connection number acquisition unit that acquires information indicating the number of the plurality of optical-terminating devices; and an array information generation unit that generates information indicating an array of the plurality of optical-terminating devices according to an arrangement order of the plurality of ground stations, and the bandwidth allocation calculation unit calculates the first and second allocation amounts on the basis of the number of the plurality of optical-terminating devices and the array of the plurality of optical-terminating devices.

According to a third aspect of the present invention, the optical transmission system of the first or second aspect further includes a traveling direction acquisition unit that acquires information indicating a moving direction of the moving object, and the bandwidth allocation calculation unit calculates the second allocation amount of the bandwidth which is allocated to the uplink signal of the another optical-terminating device connected to the another ground station having a cell which is positioned in the moving direction from the cell where the moving object is positioned.

According to a fourth aspect of the present invention, in the optical transmission system of any one of the first to third aspects, the bandwidth allocation calculation unit calculates an allocation amount of a bandwidth allocated to the uplink signal of the one optical-terminating device connected to the one ground station having the cell where the moving object is positioned and an allocation amount of a bandwidth allocated to the uplink signal of another optical-terminating device connected to another ground station of the plurality of ground stations having a cell overlapping a portion of the cell where the moving object is positioned, as the first allocation amount.

According to a fifth aspect of the present invention, in the optical transmission system of any one of the first to fourth aspects, the bandwidth allocation calculation unit subtracts a result obtained by multiplying the number of ground stations positioned at an end among the plurality of ground stations by a bandwidth determined in advance from either or both of the first and second allocation amounts.

According to a sixth aspect of the present invention, the optical transmission system of any one of the first to fifth aspects further includes a downlink frame-processing unit that transmits a signal for making an optical-terminating device of the plurality of optical-terminating devices sleep to the optical-terminating device in which traffic of the uplink signal is not generated.

According to a seventh aspect of the present invention, a bandwidth allocation method is provided which is executed by an optical transmission system, the method including: a step of acquiring an uplink signal from a wireless base station of a moving object which is positioned in a cell of one of ground stations; a step of transmitting the uplink signal acquired from the ground stations in a time-division multiplexing manner; a step of detecting a traffic amount of the uplink signal transmitted in a time-division multiplexing manner for each of optical-terminating devices; and a step of estimating one optical-terminating device of the optical-terminating devices connected to one ground station of the ground stations having a cell where the moving object is positioned on the basis of the traffic amount, and calculating a first allocation amount of a bandwidth allocated to the uplink signal of the one optical-terminating device connected to the one ground station having the cell where the moving object is positioned and a second allocation amount of a bandwidth allocated to the uplink signal of another optical-terminating device of the optical-terminating devices connected to another ground station of the ground stations having a cell adjacent to the cell where the moving object is positioned.

Advantageous Effects of Invention

The present invention makes it possible to avoid decreases of bandwidth utilization efficiency and throughput without additional delay even in a case where each of ground stations and a higher-level device are connected to each other in a TDM-PON and a bandwidth is dynamically allocated to each ground station.

DESCRIPTION OF EMBODIMENTS

Embodiments of the present invention will be described in detail with reference to the accompanying drawings.

First Embodiment

Figure 1:
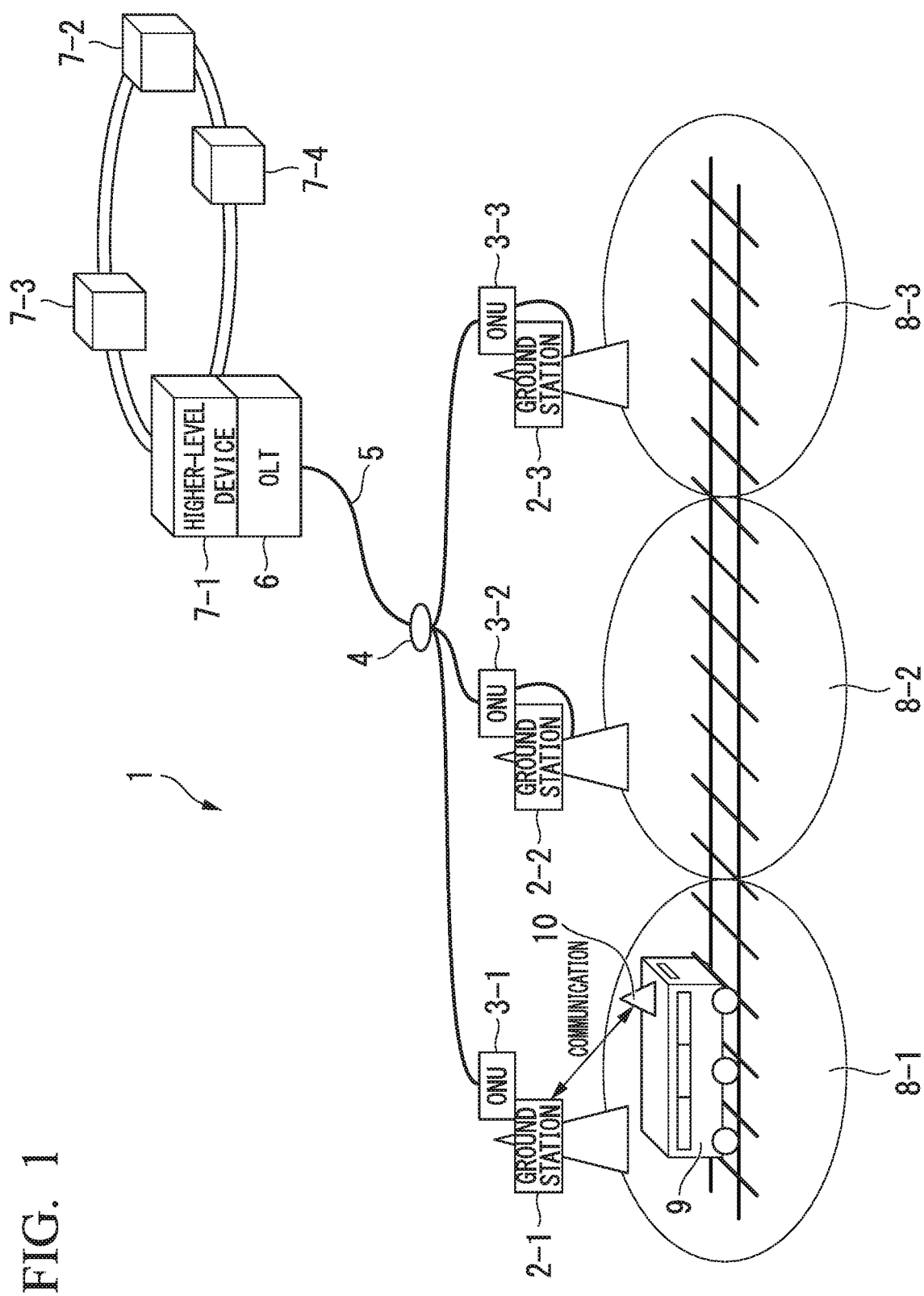
FIG. 1 is a diagram illustrating a configuration example of an optical transmission system of a first embodiment.

FIG. 1 is a diagram illustrating a configuration example of an optical transmission system 1. The optical transmission system 1 is a communication system having a TDM-PON that transmits an optical signal using time-division multiplexing. The optical transmission system 1 includes a plurality of ground stations 2, a plurality of optical network units (ONUs) 3 (optical-terminating devices), an optical splitter 4, optical fibers 5, an optical line terminal (OLT) 6 (terminal station device) and a plurality of higher-level devices 7.

Each of the ground stations 2 is a wireless base station installed on the ground. Each of the ground station 2 forms a cell 8 which is in a range available for wireless communication. The ground station 2 wirelessly communicates with a moving object installation station 10 of a moving object 9 which is positioned (located) at its own cell 8. The ground station 2 acquires (receives) an uplink signal from the moving object 9 which is positioned in its own cell 8. The ground station 2 transmits a downlink signal to the moving object 9 which is positioned in its own cell 8.

Each of the ONUs 3 is an optical-terminating device. The ONU 3 acquires the uplink signal transmitted by the moving object installation station 10 from the ground station 2. The ONU 3 acquires an optical signal indicating bandwidth allocation information from the OLT 6. The ONU 3 transmits the uplink signal which is an optical signal to the OLT 6 on the basis of the bandwidth allocation information.

The ONU 3 may transmit an optical signal indicating a request signal to the OLT 6. The ONU 3 may turn itself off and enter sleep mode in a period in which the ONU 3 is not used. Thereby, the ONU 3 can reduce power consumption.

The optical splitter 4 splits or combines optical signals transmitted in the optical fiber 5. The optical fiber 5 transmits the uplink signal which is an optical signal to the OLT 6. The optical fiber 5 transmits the downlink signal which is an optical signal to the ONU 3.

The OLT 6 is a terminal station device. The OLT 6 transmits the downlink signal which is an optical signal on which time-division multiplexing is performed to the ONU 3 through a TDM-PON system including the optical splitter 4, the optical fibers 5 and the OLT 6. The OLT 6 receives the uplink signal which is an optical signal on which time-division multiplexing is performed from the ONU 3 through a TDM-PON system including the optical splitter 4 and the optical fibers 5.

The OLT 6 may allocate bandwidths (available bandwidths) which are not used in communication with the ONU $3s$ to signals of communication services of systems other than the optical transmission system 1.

The higher-level device 7 is a communication device of a mobile network. The higher-level device 7 acquires an uplink signal (uplink frame) of mobile wireless terminals from the OLT 6.

The moving object 9 is a vehicle such as a bus or a train. The moving object 9 includes the moving object installation station 10 which is a wireless base station. The moving object installation station 10 integrates communication of mobile wireless terminals that move with the moving object 9. The mobile wireless terminals that move with the moving object 9 are wireless terminals (such as, for example, smartphones or cellular phones) possessed by people boarding the moving object 9. The moving object installation station 10 transmits the uplink signal of the mobile wireless terminals to the ground station 2, on behalf of the mobile wireless terminals that move with the moving object 9.

Figure 2:
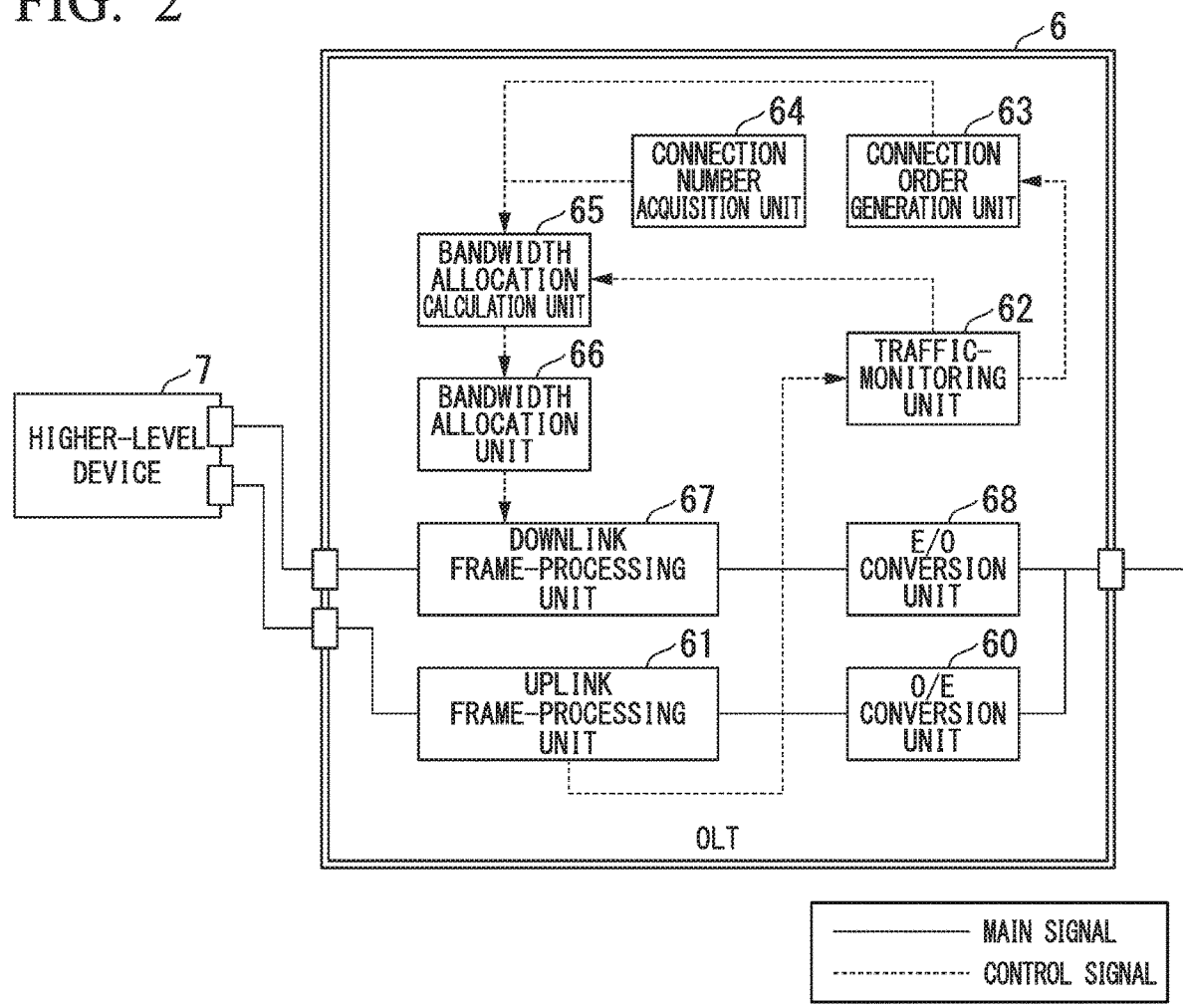
FIG. 2 is a diagram illustrating a configuration example of an OLT of the first embodiment.

A configuration example of the OLT 6 will be described. FIG. 2 is a diagram illustrating a configuration example of the OLT 6. The OLT 6 includes an O/E conversion unit 60, an uplink frame-processing unit 61, a traffic-monitoring unit 62, a connection order generation unit 63 (array information generation unit), a connection number acquisition unit 64, a bandwidth allocation calculation unit 65, a bandwidth allocation unit 66, a downlink frame-processing unit 67 and an E/O conversion unit 68.

The O/E conversion unit 60 acquires the uplink signal which is an optical signal from the ONU 3. The O/E conversion unit 60 converts the uplink signal which is an optical signal into an electrical signal. The O/E conversion unit 60 transmits the uplink signal which is an electrical signal to the uplink frame-processing unit 61.

The uplink frame-processing unit 61 transmits the uplink signal to the higher-level device 7 and the traffic-monitoring unit 62.

The traffic-monitoring unit 62 generates information indicating the traffic amount of the uplink signal (hereinafter, referred to as "traffic information") for each ONU 3 in association with a time. The traffic amount of the uplink signal transitions in a time-series manner for each ONU 3 in accordance with whether the moving object 9 is positioned (located) in the cell 8 of the ONU 3. The traffic-monitoring unit 62 transmits the traffic information for each ONU 3 to the connection order generation unit 63 and the bandwidth allocation calculation unit 65.

The traffic-monitoring unit 62 may include a storage unit having a non-volatile recording medium (non-transitory recording medium) such as a magnetic hard disk device or a semiconductor storage device. The storage unit may store an uplink signal or a program.

The connection order generation unit 63 (array information generation unit) generates information indicating the array of the ONUs 3 according to the arrangement order of the ground stations 2. The connection order generation unit 63 generates information indicating the physical connection order of the ONUs 3 connected to the OLT 6. The information indicating an array is represented using identification information such as, for example, an "ONU-ID" or an "Alloc-ID" for uniquely identifying the ONU 3. As shown in FIG. 1, the connection order of the ONUs 3 is the order of ONUs 3-1, 3-2 and 3-3. The physical connection order of the ONUs 3 is registered in advance in, for example, a database relating to the ONU 3. The arrangement order of the ground stations 2 is the order of the ground stations 2 having cells 8 through which the moving object 9 passes in a case where the moving object moves. That is, in a case where the moving object 9 moves, the order of the ground stations 2 that perform wireless communication with the moving object installation station 10 is the arrangement order of the ground stations 2. The array of the ONUs 3 according to the arrangement order of the ground stations 2 is an array indicating the order of the ONUs 3 in which the traffic of the uplink signal occurs in accordance with the movement of the moving object 9. The physical connection order of the ONUs 3 is the order of the ONUs 3 corresponding to the order of the cells 8 through which the moving object 9 passes in a case where the moving object moves. That is, the physical connection order of the ONUs 3 is the order of the ONUs 3 in which the traffic of the uplink signal transmitted to the OLT 6 occurs in accordance with the movement of the moving object 9. The ONU 3 corresponding to the cell 8 is connected to the ground station 2 having the cell 8.

The connection order generation unit 63 may estimate the physical connection order of the ONUs 3 on the basis of a history of transition of the traffic amount of the uplink signal transmitted from the moving object 9 which is a train or the like moving on a railroad track. In a case where the traffic of the uplink signal has increased in the order of the ONUs 3-1, 3-2 and 3-3, the connection order generation unit 63 may estimate the physical connection order of the ONUs 3 to be the order of the ONUs 3-1, 3-2 and 3-3.

The connection number acquisition unit 64 acquires information indicating the number of ONUs 3 connected to the OLT 6 through the optical fibers 5. The connection number acquisition unit 64 transmits the information indicating the number of ONUs 3 connected to the OLT 6 through the optical fibers 5 to the bandwidth allocation calculation unit 65.

The bandwidth allocation calculation unit 65 estimates an ONU 3 connected to the ground station 2 having a cell 8 where the moving object 9 is positioned (located), on the basis of traffic information for each ONU 3 and the number of ONUs 3. The bandwidth allocation calculation unit 65 estimates an ONU 3 in which a traffic amount indicated by the traffic information is equal to or greater than a threshold to be an ONU 3 connected to the ground station 2 having a cell 8 where the moving object 9 is positioned.

The bandwidth allocation calculation unit 65 allocates a bandwidth to the uplink signal of an ONU 3 connected to the ground station 2 having a cell 8 where the moving object 9 is positioned, on the basis of the estimation result, the number of ONUs 3 and the array of the ONUs 3. The bandwidth allocation calculation unit 65 calculates the allocation amount (first allocation amount) of a bandwidth of the uplink signal of the ONU 3 in a dynamic bandwidth allocation (DBA) period so as to perform bandwidth allocation following the movement of the moving object 9.

The bandwidth allocation calculation unit 65 allocates a bandwidth to the uplink signal of an ONU 3 connected to the ground station 2 having another cell 8 adjacent to the cell 8 where the moving object 9 is positioned, on the basis of the estimation result, the number of ONUs 3 and the array of the ONUs 3. The bandwidth allocation calculation unit 65 calculates the allocation amount (second allocation amount) of a bandwidth of the uplink signal of the ONU 3 in a DBA period so as to perform bandwidth allocation following the movement of the moving object 9.

The bandwidth allocation unit 66 allocates the bandwidth of the uplink signal to each ONU 3 on the basis of the allocation amount of the bandwidth of the uplink signal calculated by the bandwidth allocation calculation unit 65. The bandwidth allocation unit 66 transmits information (hereinafter, referred to as "bandwidth allocation information") indicating the allocation of the bandwidth of the uplink signal to the downlink frame-processing unit 67.

The downlink frame-processing unit 67 transmits the bandwidth allocation information to the E/O conversion unit 68. The downlink frame-processing unit 67 may acquire the traffic information for each ONU 3 from the traffic-monitoring unit 62. The downlink frame-processing unit 67 may transmit a signal for making an ONU 3 sleep to the ONU 3 through the E/O conversion unit 68 when the ONU 3 does not generates the traffic of the uplink signal.

The E/O conversion unit 68 converts the bandwidth allocation information into an optical signal. The E/O conversion unit 68 transmits the optical signal based on the bandwidth allocation information to the ONU 3. The E/O conversion unit 68 may transmit an optical signal for making the ONU 3 sleep to the ONU 3.

Figure 3:
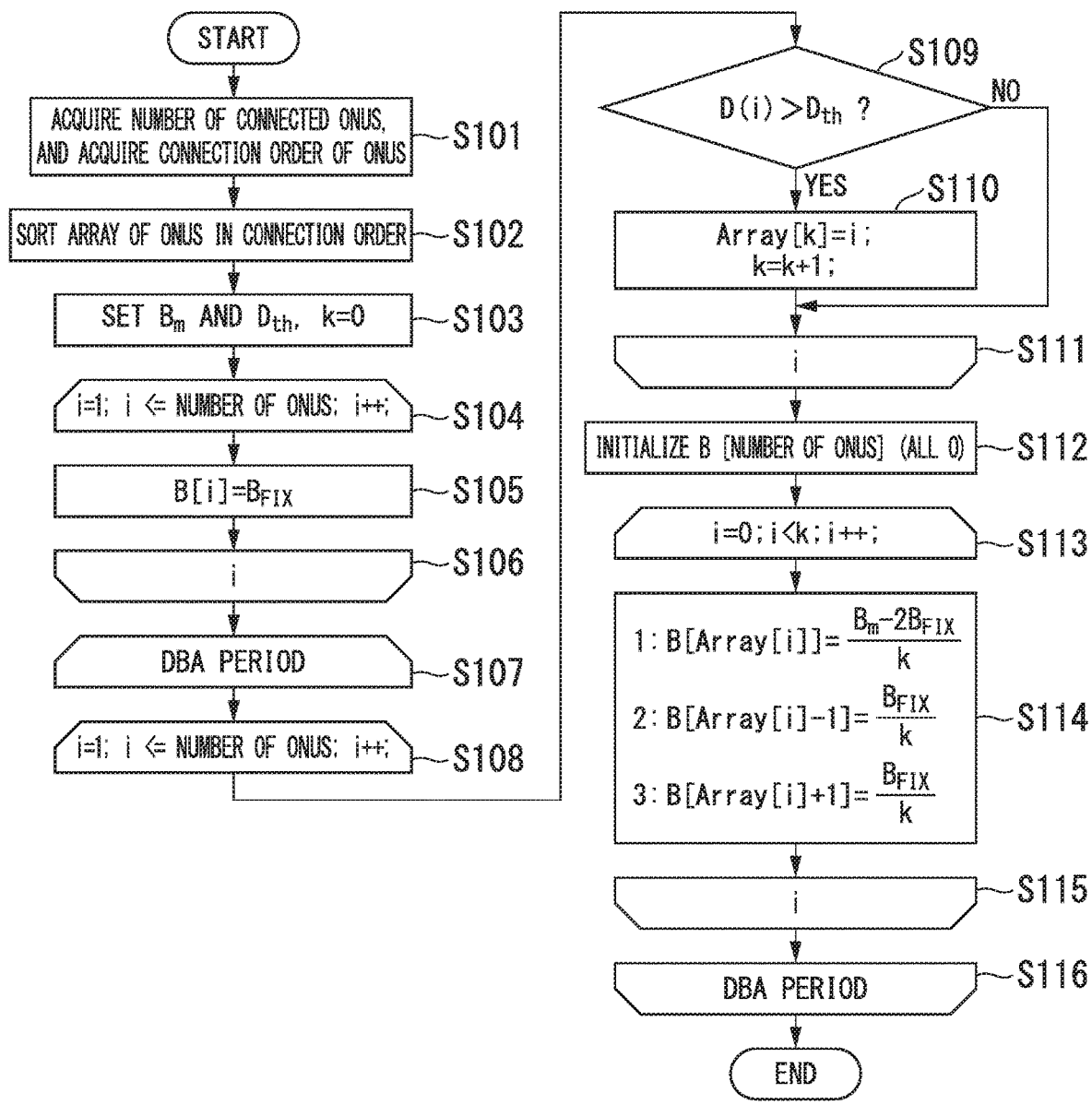
FIG. 3 is a flowchart illustrating an operation example of a bandwidth allocation calculation unit of the first embodiment.

FIG. 3 is a flowchart illustrating an operation example of the bandwidth allocation calculation unit 65. In the flowchart shown in FIG. 3, as an example, the number N of other cells 8 (the number of ground stations 2) adjacent to a cell 8 is two for each ground station 2. The bandwidth allocation calculation unit 65 executes the operation of the flowchart shown in FIG. 3 at the start of the operation of the optical transmission system 1. In an ONU 3 connected to the ground station 2 having a cell 8 where the moving object 9 is positioned, the traffic of the uplink signal is generated. In an ONU 3 connected to the ground station 2 having a cell 8 adjacent to the cell 8 where the moving object 9 is positioned, there is the possibility of the traffic of the uplink signal being generated in accordance with the movement of the moving object 9.

The bandwidth allocation calculation unit 65 acquires the information indicating the number of ONUs 3 connected to the OLT 6 through the optical fibers 5 from the connection number acquisition unit 64 (step S101). The bandwidth allocation calculation unit 65 acquires the information indicating the array of the ONUs 3 according to the arrangement order of the ground stations 2 (step S102).

The bandwidth allocation calculation unit 65 determines a maximum bandwidth $B_m$ capable of being used in a TDM-PON. In the TDM-PON having a maximum transmission speed of 10 Gbps class, in a case where a decrease in bandwidth utilization efficiency due to overhead is not considered, the maximum bandwidth $B_m$ is 10 Gbps. The bandwidth allocation calculation unit 65 determines a threshold $D_{th}$ for determining that traffic has been generated. A variable k for counting the number of ONUs 3 in which traffic is generated is initialized to 0 (step S103). The threshold $D_{th}$ may be determined in advance.

The bandwidth allocation calculation unit 65 allocates a static bandwidth $B_{FIX}$ determined in advance to the uplink signals of each ONU 3-*i* (i is the identification number of the ONU 3) of the optical transmission system 1 (steps S104 to S106).

The bandwidth allocation calculation unit 65 executes steps S107 to S116 in the DBA period (steps S107 to S116).

The bandwidth allocation calculation unit 65 acquires the traffic information for each ONU 3 from the traffic-monitoring unit 62 having detected an ONU 3 in which the traffic of the uplink signal is generated. The bandwidth allocation calculation unit 65 determines whether the traffic amount of the uplink signal exceeds the threshold $D_{th}$ for each ONU 3. In a case where a result obtained by increasing an identification number i such as an ONU-ID exceeds the number of ONUs 3, the bandwidth allocation calculation unit 65 advances the process to step S112 (steps S108 to S111).

In a case where the traffic amount of the uplink signal does not exceed the threshold $D_{th}$ (step S109: NO), the bandwidth allocation calculation unit 65 returns the process to step S108 (step S111). In a case where the traffic amount of the uplink signal exceeds the threshold $D_{th}$ (step S109: YES), the bandwidth allocation calculation unit 65 registers the identification number i of an ONU 3 in which the traffic amount of the uplink signal exceeds the threshold $D_{th}$ in an array Array[k]. The bandwidth allocation calculation unit 65 adds 1 to the variable k, and advances the process to step S111 (step S110).

The bandwidth allocation calculation unit 65 initializes to 0 the bandwidth B of the uplink signal for each ONU 3 of the optical transmission system 1 (step S112). The bandwidth allocation calculation unit 65 repeats steps S113 to S115 for each ONU 3 in which the traffic amount of the uplink signal exceeds the threshold $D_{th}$ (steps S113 to S115).

The bandwidth allocation calculation unit 65 allocates the bandwidth B [Array[i]] to the uplink signal of the ONU 3 in which the traffic amount of the uplink signal exceeds the threshold $D_{th}$ on the basis of Expression (1).

[Math. 1]

$$B = \frac{B_m - NB_{FIX}}{k} \quad (1)$$

Hereinafter, another cell 8 adjacent to the cell 8 of the ground station 2 connected to the ONU 3 in which the traffic amount of the uplink signal exceeds the threshold $D_{th}$ is referred to as an "adjacent cell". That is, a cell 8 adjacent to a cell 8 in which it is estimated that the moving object 9 is positioned is referred to as an "adjacent cell".

In a case where the moving object 9 moves from the cell 8 of the ground station 2 of the ONU 3 in which the traffic amount of the uplink signal exceeds the threshold $D_{th}$ to an adjacent cell, the traffic-monitoring unit 62 is required to detect the traffic amount of the uplink signal of the ONU 3 connected to the ground station 2 having the adjacent cell. For this reason, the bandwidth allocation calculation unit 65 allocates a bandwidth B' (=B [Array[i]+1]) represented by Expression (2) to the uplink signal of an ONU 3 connected to the ground station 2 having a first adjacent cell. The bandwidth allocation calculation unit 65 allocates a bandwidth B' (=B [Array[i]−1]) represented by Expression (2) to the uplink signal of an ONU 3 connected to the ground station 2 having a second adjacent cell (step S114).

[Math. 2]

$$B' = \frac{B_{FIX}}{k} \quad (2)$$

The bandwidth allocation calculation unit 65 may multiply the bandwidth B' represented by Expression (2) by a proportionality constant α.

In a case where a bandwidth is not allocated to the uplink signal of the ONU 3 in which the traffic amount of the uplink signal exceeds the threshold $D_{th}$ and the uplink signal of the ONU 3 connected to the ground station 2 having an adjacent cell, the bandwidth allocation calculation unit 65 returns the process to step S113 (step S115). In a case where the bandwidth B is allocated to the uplink signal of the ONU 3 in which the traffic amount of the uplink signal exceeds the threshold $D_{th}$, and the bandwidth B' is allocated to the uplink signal of the ONU 3 connected to the ground station 2 having an adjacent cell, the bandwidth allocation calculation unit 65 may not allocate a bandwidth to the uplink signal of another ONU 3.

The bandwidth allocation calculation unit 65 returns the process to step S107 (step S116).

As described above, the optical transmission system 1 of the first embodiment includes a plurality of ground stations 2, a plurality of ONUs 3, the traffic-monitoring unit 62 and the bandwidth allocation calculation unit 65. The ground station 2 acquires an uplink signal from the moving object installation station 10 of the moving object 9 which is positioned in its own cell. The ONU 3 transmits the uplink signal acquired from the ground station 2 in a time-division multiplexing manner. The traffic-monitoring unit 62 detects the traffic amount of the uplink signal transmitted in a time-division multiplexing manner for each ONU 3. The bandwidth allocation calculation unit 65 estimates an ONU 3 connected to the ground station 2 having the cell 8 where the moving object 9 is positioned, on the basis of the traffic amount of the uplink signal. The bandwidth allocation calculation unit 65 calculates a bandwidth B [Array[i]] to be allocated to the uplink signal of the ONU 3 connected to the ground station 2 having the cell 8 where the moving object 9 is positioned. The bandwidth allocation calculation unit 65 calculates a bandwidth B [Array[i]±1] to be allocated to the uplink signal of another ONU 3 connected to the ground station 2 having another cell 8 adjacent to the cell 8 where the moving object 9 is positioned. A bandwidth B' is allocated to another ONU 3 connected to the ground station 2 having another cell 8 adjacent to the cell 8 where the moving object 9 is positioned, whereby the OLT 6 can detect that the moving object 9 has moved to another cell 8 on the basis of the traffic amount of the uplink signal. The OLT 6 calculates a bandwidth allocated to the uplink signal of each ONU 3 on the basis of a detection result, and updates the allocated bandwidth.

Thereby, in a case where a plurality of ground stations 2 and a higher-level device 7 are connected to each other in a TDM-PON and a bandwidth is dynamically allocated to each ground station 2, the optical transmission system 1 of the first embodiment makes it possible to avoid a decrease of bandwidth utilization efficiency and throughput without additional delay.

The optical transmission system 1 of the first embodiment makes it possible to increase the number of ONUS 3 received by the OLT 6.

Second Embodiment

A second embodiment is different from the first embodiment, in that the traveling direction of the moving object 9 is already known. In the second embodiment, only differences from the first embodiment will be described.

Figure 4:
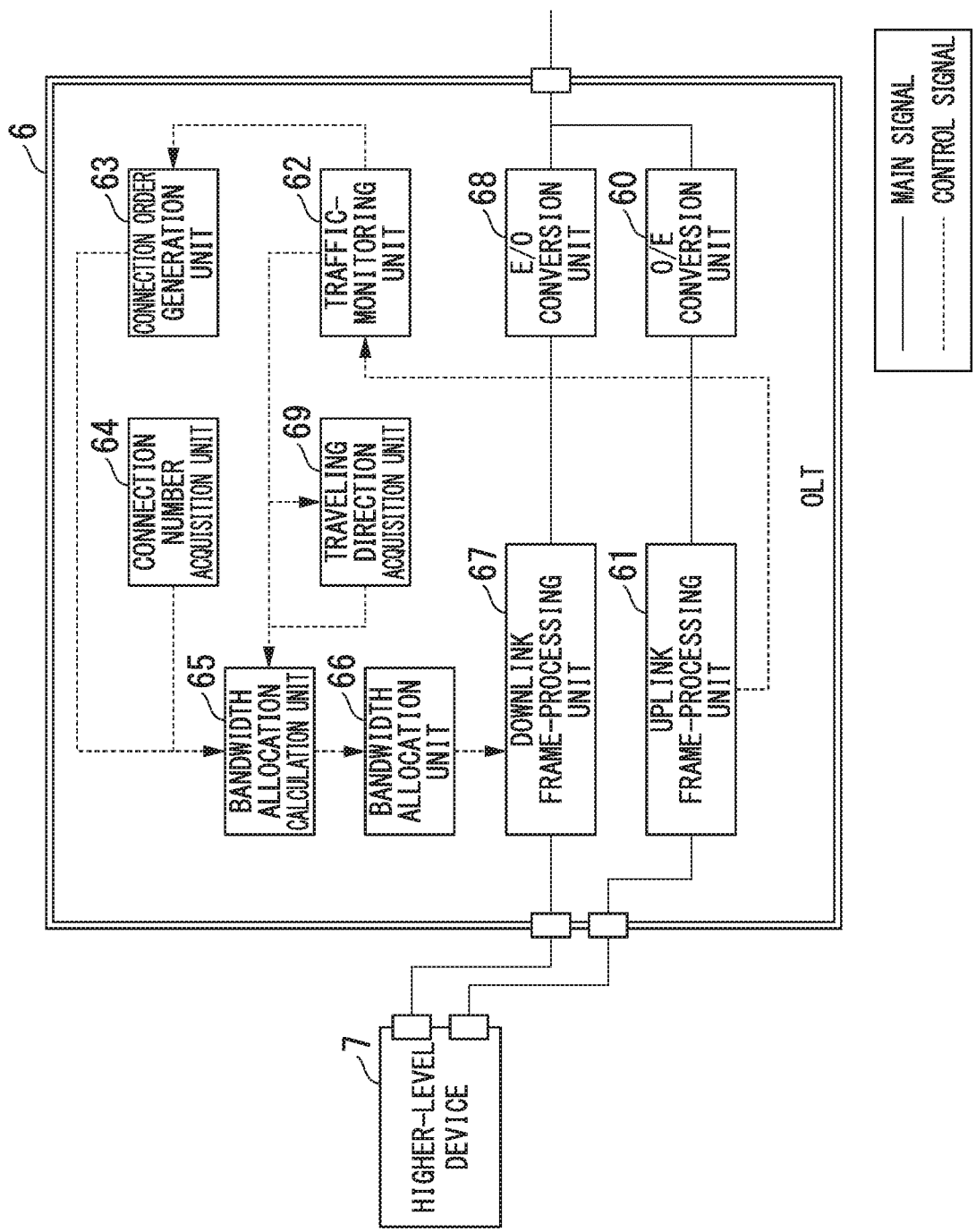
FIG. 4 is a diagram illustrating a configuration example of an OLT of a second embodiment.

FIG. 4 is a diagram illustrating a configuration example of the OLT 6. The OLT 6 includes an O/E conversion unit 60, an uplink frame-processing unit 61, a traffic-monitoring unit 62, a connection order generation unit 63 (connection order arrangement unit), a connection number acquisition unit 64, a bandwidth allocation calculation unit 65, a bandwidth allocation unit 66, a downlink frame-processing unit 67, an E/O conversion unit 68 and a traveling direction acquisition unit 69.

The traveling direction acquisition unit 69 acquires information indicating the traveling direction of the moving object 9. The information indicating the traveling direction of the moving object 9 is registered in advance in, for example, a database relating to the moving object 9. In a case where the moving object 9 is a train, the traveling direction of the moving object 9 moving on a railroad track is determinable on the basis of a direction in which the railroad track is laid. The traveling direction acquisition unit 69 transmits the information (traveling direction information) indicating the traveling direction of the moving object 9 to the bandwidth allocation calculation unit 65. For example, the information indicating the traveling direction of the moving object 9 is represented as a positive direction or a negative direction. The positive direction is a direction indicating an order registered in the array Array[k]. The negative direction is a direction indicating the reverse of the order registered in the array Array[k].

In a case where traffic information indicating the traffic amount of the uplink signal is acquired from the traffic-monitoring unit 62, the traveling direction acquisition unit 69 may estimate the traveling direction of the moving object 9 on the basis of a history of transition of the traffic amount of the uplink signal.

Figure 5:
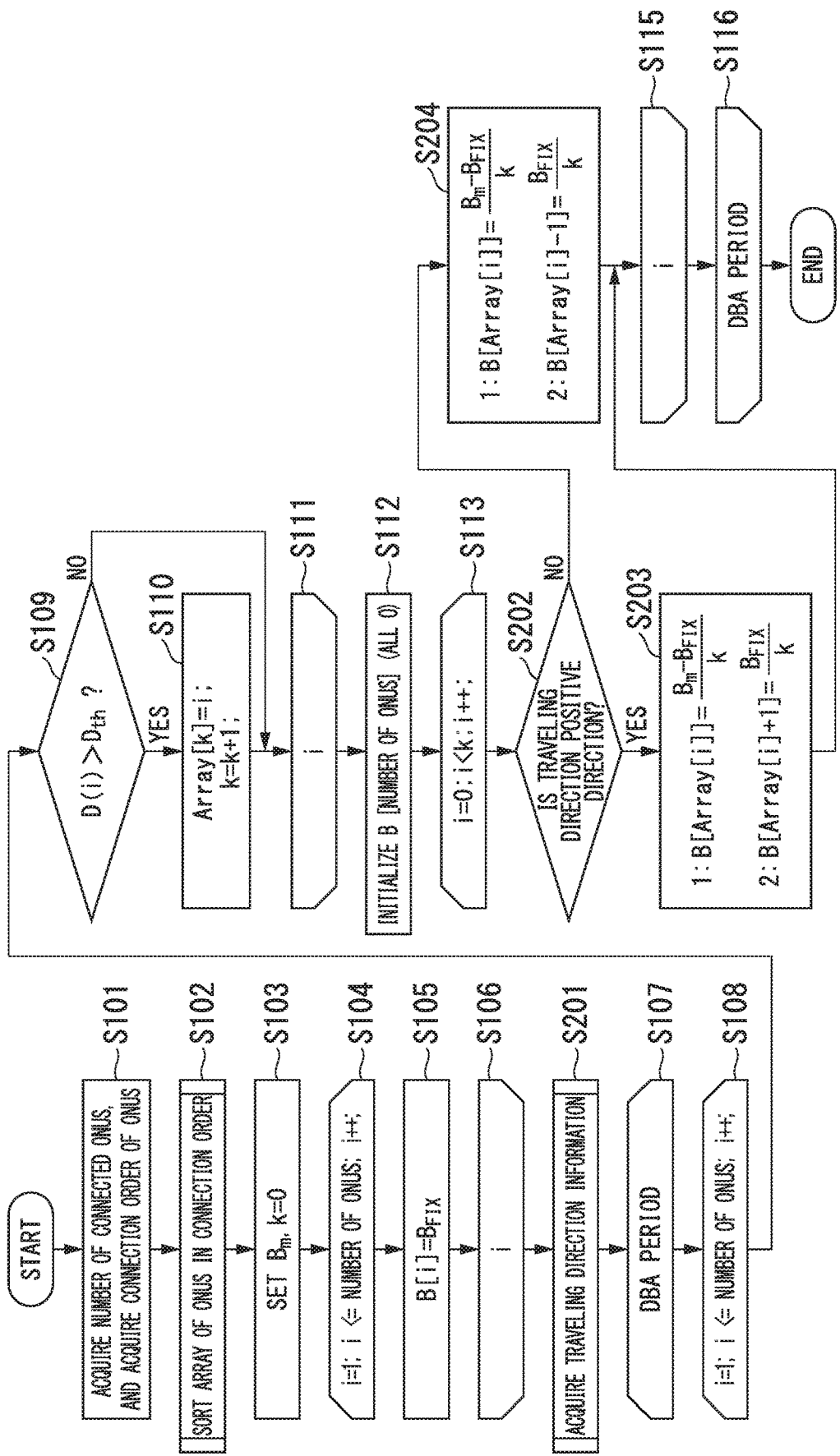
FIG. 5 is a flowchart illustrating an operation example of a bandwidth allocation calculation unit of the second embodiment.

FIG. 5 is a flowchart illustrating an operation example of the bandwidth allocation calculation unit 65. In the flowchart shown in FIG. 5, steps S201 to S204 are added as compared with the flowchart shown in FIG. 3.

Subsequently to step S106, the bandwidth allocation calculation unit 65 acquires the information indicating the traveling direction of the moving object 9 from the traveling direction acquisition unit 69 (step S201). Subsequently to step S113, the bandwidth allocation calculation unit 65 determines whether the traveling direction of the moving object 9 is a positive direction (step S202).

In a case where the traveling direction of the moving object 9 is a positive direction (step S202: YES), the bandwidth allocation calculation unit 65 allocates a bandwidth B [Array[i]] represented by Expression (3) to the uplink signal of the ONU 3 in which the traffic amount of the uplink signal exceeds the threshold $D_{th}$.

[Math. 3]

$$B = \frac{B_m - B_{FIX}}{k} \quad (3)$$

The bandwidth allocation calculation unit 65 allocates a bandwidth B' (=B [Array[i]+1]) represented by Expression (4) to the uplink signal of an ONU 3 connected to the ground station 2 having an adjacent cell in a direction (positive direction) in which the moving object 9 travels.

[Math. 4]

$$B' = \frac{B_{FIX}}{k} \quad (4)$$

Since it is determined that the traveling direction of the moving object 9 is a positive direction, the bandwidth allocation calculation unit 65 may not allocate the bandwidth B to the uplink signal of the ONU 3 connected to the ground station 2 having an adjacent cell in an opposite direction (negative direction) to the direction in which the moving object 9 travels. Therefore, the number of bandwidths B represented by Expression (3) is greater than the number of bandwidths B represented by Expression (1) (step S203). The bandwidth allocation calculation unit 65 advances the process to step S115.

In a case where the traveling direction of the moving object 9 is a negative direction (step S202: NO), the bandwidth allocation calculation unit 65 allocates the bandwidth B [Array[i]] represented by Expression (3) to the uplink signal of the ONU 3 in which the traffic amount of the uplink signal exceeds the threshold $D_{th}$.

The bandwidth allocation calculation unit 65 allocates a bandwidth B' represented by Expression (4) to the uplink signal of the ONU 3 connected to the ground station 2 having an adjacent cell in the direction (negative direction) in which the moving object 9 travels. Since it is determined that the traveling direction of the moving object 9 is a negative direction, the bandwidth allocation calculation unit 65 may not allocate the bandwidth B to the uplink signal of the ONU 3 connected to the ground station 2 having an adjacent cell in the direction (positive direction) in which the moving object 9 travels. Therefore, the number of bandwidths B represented by Expression (3) is greater than the number of bandwidths B represented by Expression (1) (step S204). The bandwidth allocation calculation unit 65 advances the process to step S115.

As described above, the bandwidth allocation calculation unit 65 of the second embodiment calculates a bandwidth B [Array[i]+1] or a bandwidth B [Array[i]-1] which is allocated to the uplink signal of another ONU 3 connected to the ground station 2 having a cell 8 which is positioned in the moving direction of the moving object 9 with respect to a cell 8 where the moving object 9 is positioned.

Thereby, in a case where a plurality of ground stations 2 and a higher-level device 7 are connected to each other in a TDM-PON and a bandwidth is dynamically allocated to each ground station 2, the optical transmission system 1 of the second embodiment makes it possible to avoid a decrease of throughput without additional delay after improving bandwidth utilization efficiency.

The traveling direction of the moving object 9 is determined, whereby the bandwidth allocation calculation unit 65 is not required to allocate a bandwidth to the uplink signal of an ONU 3 connected to the ground station 2 having a cell which is not positioned in the traveling direction among adjacent cells. The bandwidth allocation calculation unit 65 improves bandwidth utilization efficiency, thereby allowing wider bandwidths to be allocated to the uplink signal of an ONU 3 connected to the ground station 2 having a cell 8 where the moving object 9 is positioned.

Third Embodiment

A third embodiment is different from the first embodiment and the second embodiment, in that a cell 8 partially overlaps with an adjacent cell. In the third embodiment, only differences from the first embodiment and the second embodiment will be described.

Figure 6:
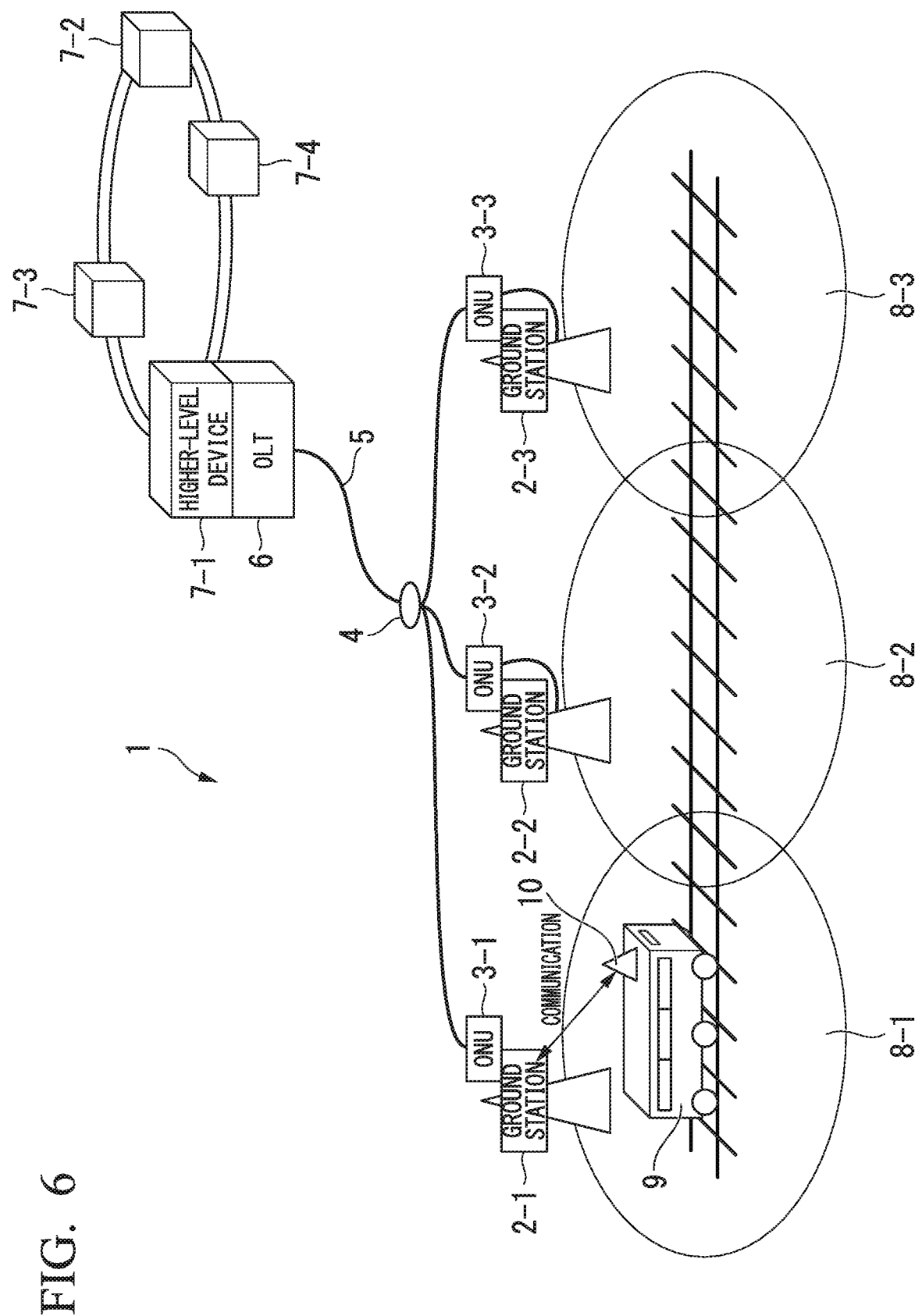
FIG. 6 is a diagram illustrating a configuration example of an optical transmission system of a third embodiment.

FIG. 6 is a diagram illustrating a configuration example of an optical transmission system 1. The optical transmission system 1 includes a plurality of ground stations 2, a plurality of ONUs 3 (optical-terminating devices), an optical splitter 4, an optical fiber 5, an OLT 6 (terminal station device) and a plurality of higher-level devices 7. As shown in FIG. 6, a portion of a cell 8 and a portion of an adjacent cell overlap each other. As shown in FIG. 6, since the moving object 9 may be positioned in a plurality of cells 8, the bandwidth allocation calculation unit 65 is required to allocate a sufficient bandwidth to the uplink signal of an ONU 3 with respect to the plurality of cells 8 where the moving object 9 is positioned.

Figure 7:
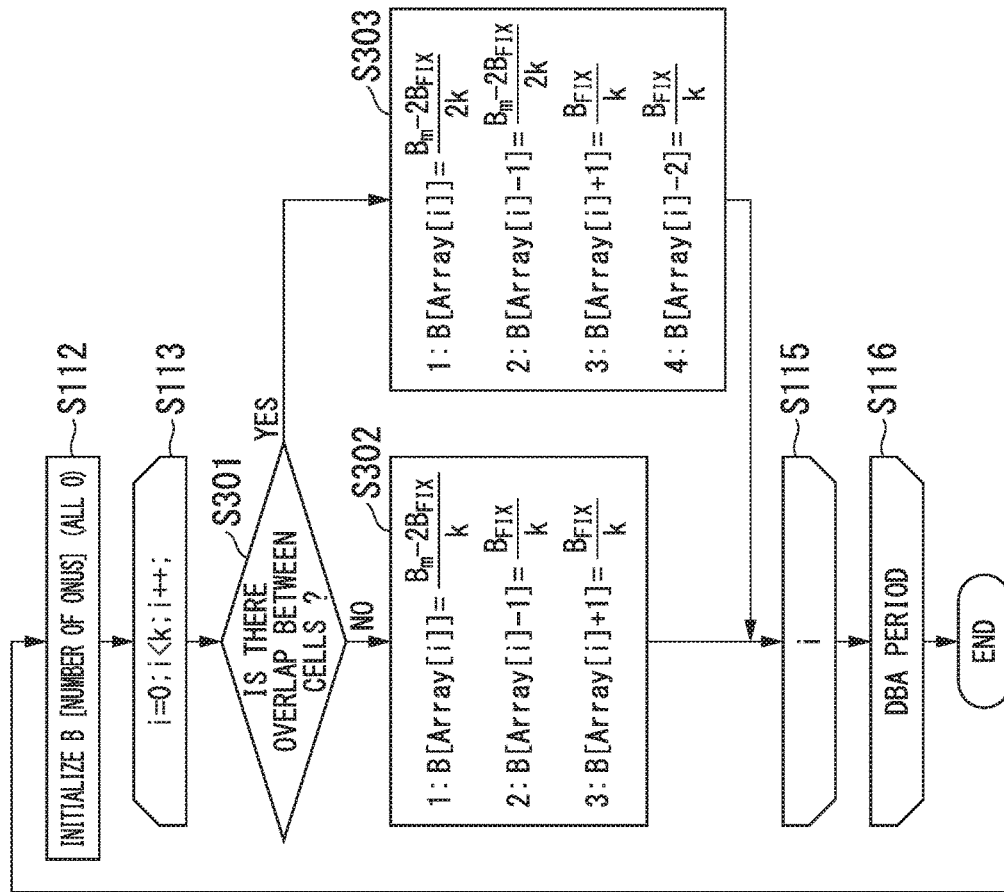
FIG. 7 is a flowchart illustrating an operation example of a bandwidth allocation calculation unit of the third embodiment.
Figure 7:
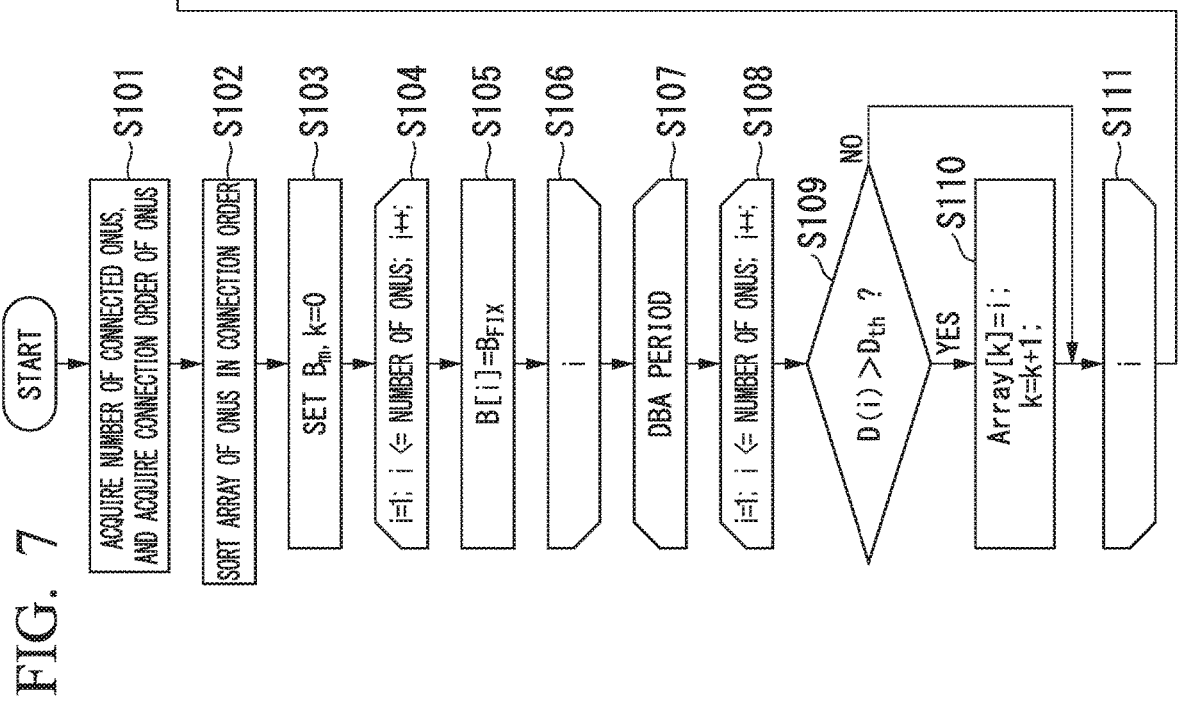

FIG. 7 is a flowchart illustrating an operation example of the bandwidth allocation calculation unit 65. In the flowchart shown in FIG. 7, steps S301 to S303 are added as compared with the flowchart shown in FIG. 3.

Subsequently to step S113, the bandwidth allocation calculation unit 65 determines whether at least a portion of a cell 8 and at least a portion of an adjacent cell overlap each other (step S301).

In a case where a cell 8 and an adjacent cell do not overlap each other (step S302: NO), the bandwidth allocation calculation unit 65 allocates the bandwidth B [Array[i]] represented by Expression (1) to the uplink signal of the ONU 3 in which the traffic amount of the uplink signal exceeds the threshold $D_{th}$, similarly to step S114. The bandwidth allocation calculation unit 65 allocates the bandwidth B' (=B [Array[i]+1], B [Array[i]−1]) represented by Expression (2) to the uplink signal of the ONU 3 connected to the ground station 2 having an adjacent cell (step S302).

In a case where at least a portion of a cell 8 and at least a portion of an adjacent cell overlap each other (step S302: YES), the bandwidth allocation calculation unit 65 allocates a bandwidth $B^{(i)}$ (=B [Array[i]]) represented by Expression (5) to the uplink signal of the ONU 3 in which the traffic amount of the uplink signal exceeds the threshold $D_{th}$. The bandwidth allocation calculation unit 65 allocates a bandwidth $B^{(i-1)}$ (=B [Array[i]−1]) represented by Expression (5) to the uplink signal of the ONU 3 connected to the ground station 2 having an adjacent cell that overlaps a cell 8.

[Math. 5]

$$B^{(i)} = \frac{B_m - NB_{FIX}}{M^{(i)}k} \quad (5)$$

As shown in FIG. 7, a variable i indicates the identification number of the ONU 3 in which the traffic amount of the uplink signal exceeds the threshold $D_{th}$. $M^{(i)}$ is a variable indicating the number of ground stations 2 having adjacent cells overlapped with a cell 8 of a ground station 2 to which an $ONU^{(i)}$ is connected. $M^{(i)}$ is 2.

The bandwidth allocation calculation unit 65 allocates a bandwidth B' (=B [Array[i]+1]) represented by Expression (6) to the uplink signal of an ONU 3 connected to the ground station 2 having an adjacent cell which is positioned in the positive direction of the moving object 9.

[Math. 6]

$$B' = \frac{B_{FIX}}{k} \quad (6)$$

The bandwidth allocation calculation unit 65 allocates a bandwidth B' (=B [Array[i]−2]) represented by Expression (6) to the uplink signal of an ONU 3 connected to the ground station 2 having an adjacent cell which is positioned in the negative direction of the moving object 9 (step S303). Subsequently to step S302 or step S303, the bandwidth allocation calculation unit 65 advances the process to step S115.

As described above, the bandwidth allocation calculation unit 65 of the third embodiment calculates a bandwidth B [Array[i]] and a bandwidth B [Array[i]-1] allocated to the uplink signal of the ONU 3 connected to the ground station 2 having a cell 8 where the moving object 9 is positioned. The bandwidth allocation calculation unit 65 calculates a bandwidth B [Array[i]+1] and a bandwidth B [Array[i]-2] allocated to the uplink signal of another ONU 3 connected to the ground station 2 having another cell 8 overlapping a portion of the cell 8.

Thereby, in a case where a plurality of ground stations 2 and a plurality of higher-level devices 7 are connected to each other in a TDM-PON and a bandwidth is dynamically allocated to each ground station 2, the optical transmission system 1 of the third embodiment makes it possible to avoid a decrease of bandwidth utilization efficiency and throughput without additional delay.

Fourth Embodiment

A fourth embodiment is different from the third embodiment, in that the moving object 9 goes into a cell 8-1 of a ground station 2-1 positioned at the end, whereby the traffic of an uplink signal is newly generated in an OLT 6-1. In the fourth embodiment, only differences from the third embodiment will be described. The ground station 2 positioned at the end refers to a ground station 2 having a cell adjacent to a cell of another ground station 2 connected to an OLT 6 different from an OLT 6 to which the ground station 2 is connected.

Figure 8:
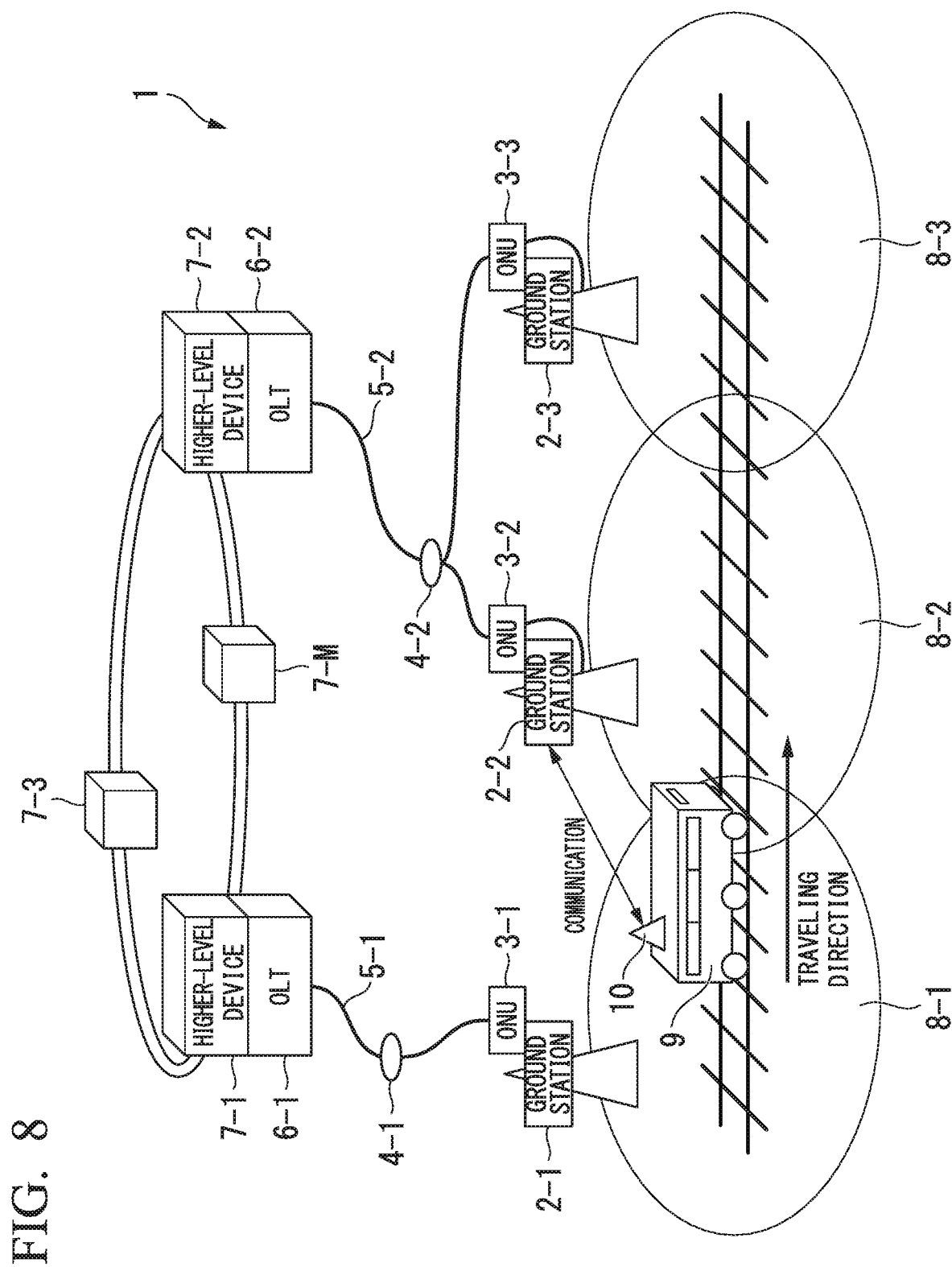
FIG. 8 is a diagram illustrating a configuration example of an optical transmission system of a fourth embodiment.
Figure 9:
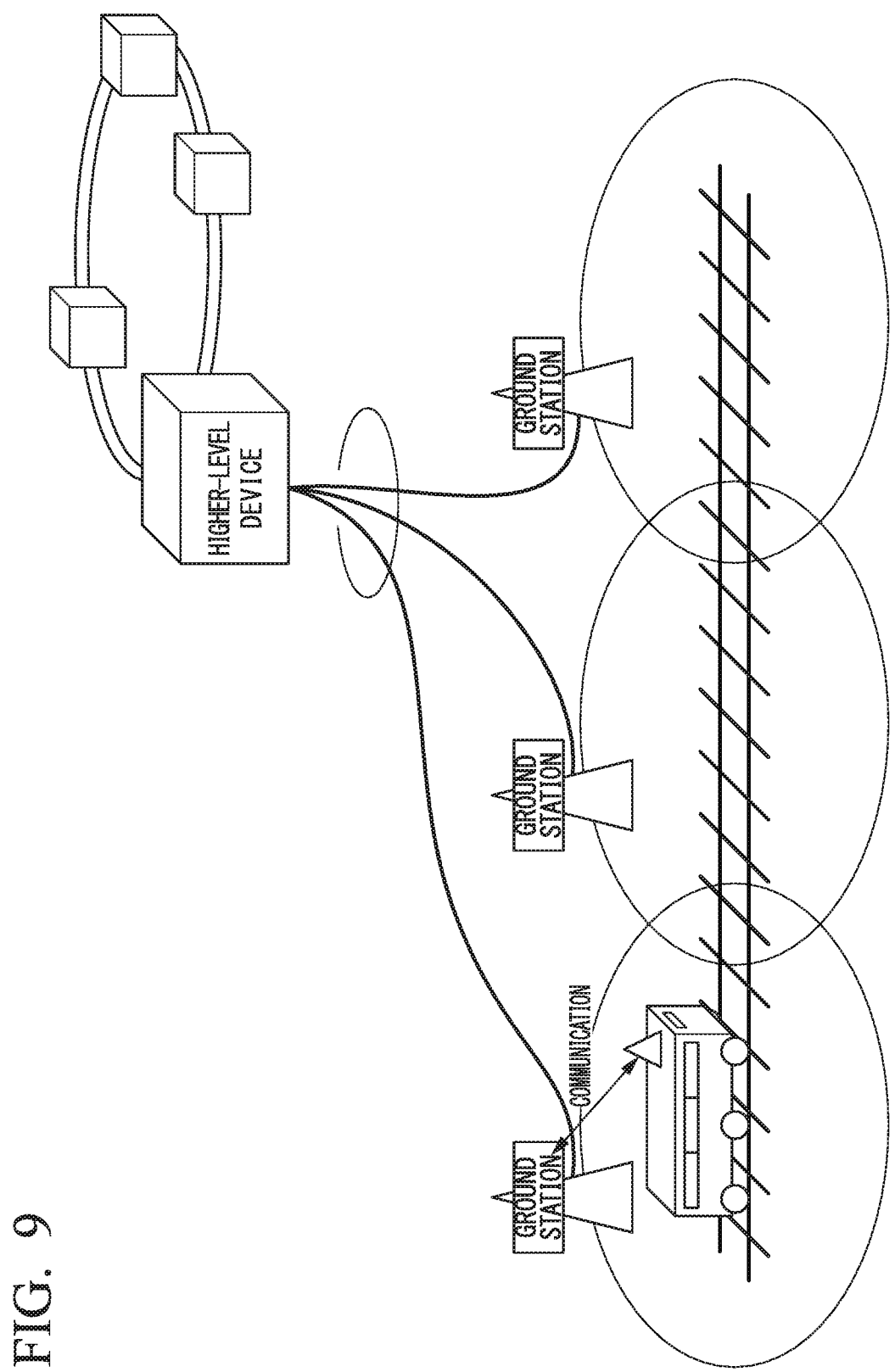
FIG. 9 is a diagram illustrating a configuration example of an optical transmission system of the related art.
Figure 10:
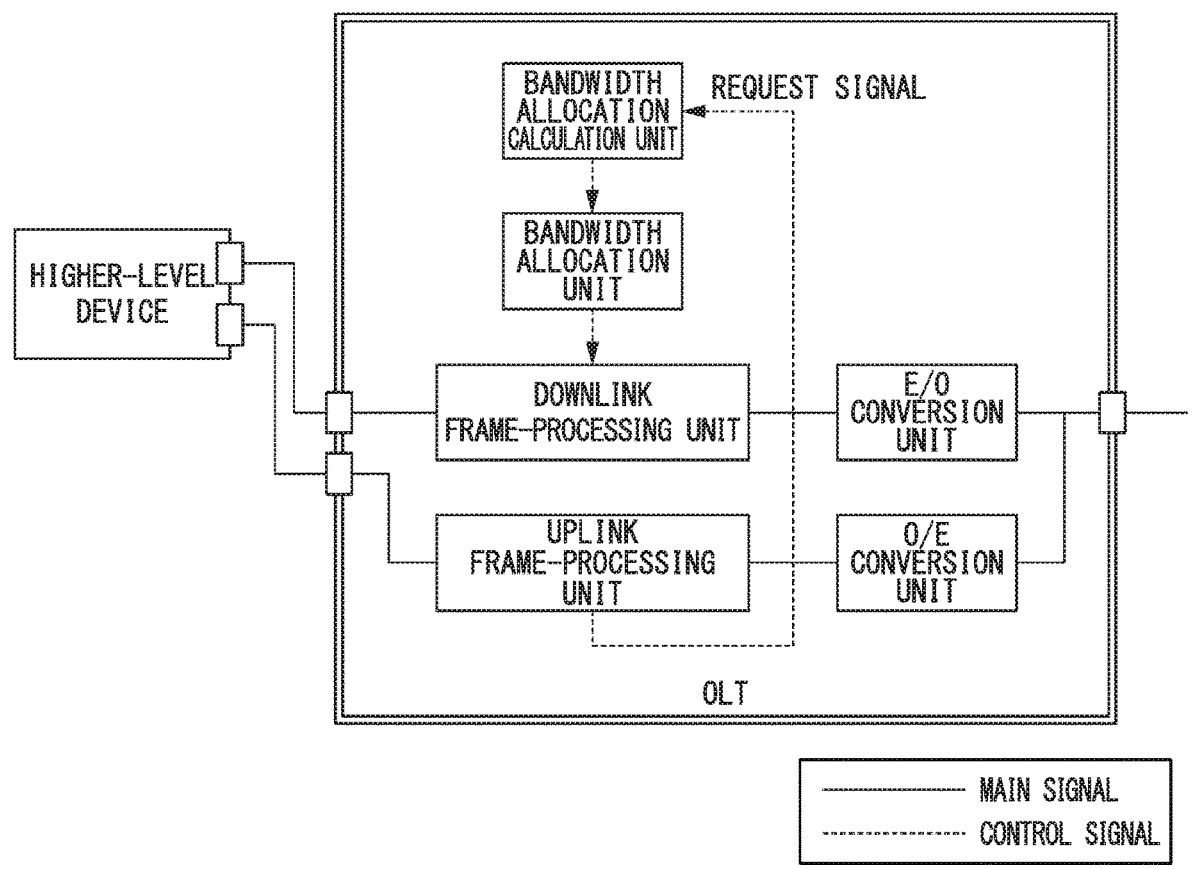
FIG. 10 is a diagram illustrating a configuration example of an OLT of the related art.
Figure 11:
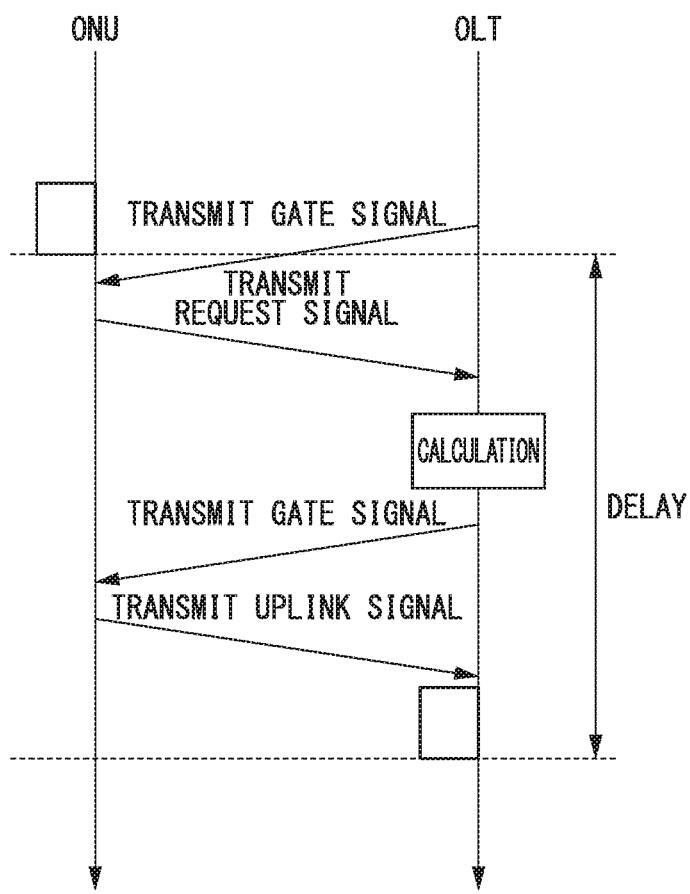
FIG. 11 is a diagram illustrating an example of a bandwidth allocation method of the related art.

FIG. 8 is a diagram illustrating a configuration example of an optical transmission system 1. The optical transmission system 1 includes a plurality of ground stations 2, a plurality of ONUS 3 (optical-terminating devices), a plurality of optical splitters 4, a plurality of optical fibers 5, a plurality of OLTs 6 (terminal station devices) and a plurality of higher-level devices 7. As shown in FIG. 8, the ground stations 2-1 and 2-2 are ground stations 2 positioned at the end described above. In a case where the moving object installation station 10 moves from the cell 8-1 of the ground station 2-1 to the cell 8-2 of the ground station 2-2, the OLT 6-2 is required to perform bandwidth allocation according to traffic increasing in the ONU 3-2. Even in a case where the moving object installation station 10 moves from the cell 8-2 of the ground station 2-2 to the cell 8-1 of the ground station 2-1, the OLT 6-1 is required to perform bandwidth allocation according to traffic increasing in the ONU 3-1.

The ground station 2-1 is positioned at the end among the plurality of ground stations 2 of the optical transmission system 1. The ONU 3-1 of the ground station 2-1 communicates with the OLT 6-1 through the optical splitter 4-1 and the optical fiber 5-1. The ONU 3-2 of the ground station 2-2 communicates with the OLT 6-2 through the optical splitter 4-2 and the optical fiber 5-2. The ONU 3-3 of the ground station 2-3 communicates with the OLT 6-2 through the optical splitter 4-2 and the optical fiber 5-2.

In the ground station 2-1 positioned at the end among the ground stations 2 of the optical transmission system 1, the moving object 9 goes into the cell 8-1, whereby the traffic of an uplink signal is newly generated. For this reason, the OLT 6-1 is required to allocate a bandwidth γ of the uplink signal for detecting the ONU 3-1, in which the traffic amount of the uplink signal is newly generated, to the uplink signal of the ONU 3-1 of the ground station 2-1 positioned at the end.

The number of ground stations positioned at the end among the ground stations 2 of the optical transmission system 1 may be plural. Hereinafter, the number of ground stations 2 positioned at the end is denoted by "L".

The bandwidth allocation calculation unit 65 multiplies the bandwidth γ by the number L of ground stations 2 positioned at the end. The bandwidth allocation calculation unit 65 allocates a bandwidth to the uplink signal of the ONU 3 on the basis of a result obtained by subtracting "γL" from each or any of Expressions (1) to (6). The bandwidth allocation calculation unit 65 may allocate a bandwidth to the uplink signal of an ONU 3 connected to the ground station 2 positioned at the end, on the basis of "γL" which is a result obtained by multiplying the bandwidth γ by the number L of ground stations 2 positioned at the end. Specifically, in preparation for a case where the moving object installation station 10 moves from the cell 8-1 of the ground station 2-1 connected to another OLT 6-1 to the cell 8-2 of the ground station 2-2 connected to a host device, the OLT 6-2 allocates a portion of the bandwidth γL or the bandwidth γ to the ONU 3-2 that transmits the uplink signal of the ground station 2-2. The OLT 6-1 allocates a portion of the bandwidth γL or the bandwidth γ to the ONU 3-1 that transmits the uplink signal of the ground station 2-1.

As described above, the bandwidth allocation calculation unit 65 of the fourth embodiment subtracts "γL" which is a result obtained by multiplying the number L of ground stations 2 positioned at the end among the plurality of ground stations 2 by the bandwidth γ determined in advance, from the bandwidth allocation amount of the uplink signal. The bandwidth allocation calculation unit 65 allocates the bandwidth γL to the OLT 6 connected to the ground station 2 positioned at the end.

Thereby, in a case where a plurality of ground stations 2 and a plurality of higher-level devices 7 are connected to each other in a TDM-PON, the optical transmission system 1 of the fourth embodiment makes it possible to avoid a decrease of bandwidth utilization efficiency and throughput without additional delay even after the start of the operation of dynamic allocation shown in FIG. 3, 5 or 7.

The operations of the OLTs 6 described in the first embodiment to the fourth embodiment may be combined.

At least some of the wireless base station, the ground station, the moving object installation station and the optical transmission system in the above-described embodiment may be realized by a computer. In that case, a program for realizing this function may be recorded in a computer-readable recording medium, and be realized by causing a computer system/processor to read and execute the program recorded in this recording medium. The term "computer system" as used herein is assumed to include an OS or hardware such as peripheral devices. In addition, the term "computer-readable recording medium" refers to a portable medium such as a flexible disk, a magneto-optic disc, a ROM, or a CD-ROM, and a storage device such as a hard disk built into the computer system. Further, the "computer-readable recording medium" may also include recording mediums that dynamically hold a program during a short period of time like networks such as the Internet or communication lines when a program is transmitted through communication lines such as a telephone line, and recording mediums that hold a program for a certain period of time like a volatile memory inside a computer system serving as a server or a client in that case. In addition the above-mentioned program may be a program which is used for realizing a portion of the aforementioned functions, may be a program which is capable of realizing the aforementioned functions by a combination of programs previously recorded in the computer system, and may be a program which is realized using a programmable logic device such as a field-programmable gate array (FPGA).

Hereinbefore, the embodiments of the present invention have been described in detail with the accompanying drawings, but specific configurations are not limited to these embodiments, and may also include a design and the like without departing from the scope of the present invention.

INDUSTRIAL APPLICABILITY

The present invention can be applied to an optical transmission system.

REFERENCE SIGNS LIST

1 Optical transmission system
2 Ground station
3 ONU
4 Optical splitter
5 Optical fiber
6 OLT
7 Higher-level device
8 Cell
9 Moving object
10 Moving object installation station
60 O/E conversion unit
61 Uplink frame-processing unit
62 Traffic-monitoring unit
63 Connection order generation unit
64 Connection number acquisition unit
65 Bandwidth allocation calculation unit
66 Bandwidth allocation unit
67 Downlink frame-processing unit
68 E/O conversion unit
69 Traveling direction acquisition unit

The invention claimed is:
1. An optical transmission system comprising:
a plurality of ground stations, each acquiring an uplink signal from a wireless base station of a moving object which is positioned in an own cell;
a plurality of optical-terminating devices that transmit the uplink signal acquired from the plurality of ground stations in a time-division multiplexing manner;
a traffic monitor that detects a traffic amount of the uplink signal transmitted in a time-division multiplexing manner for each of the plurality of optical-terminating devices; and
a bandwidth allocation calculator that estimates one optical-terminating device of the plurality of optical-terminating devices connected to one ground station of the plurality of ground stations having a cell where the moving object is positioned on a basis of the traffic amount, and calculates a first allocation amount of a bandwidth allocated to the uplink signal of the one optical-terminating device connected to the one ground station having the cell where the moving object is positioned and a second allocation amount of a bandwidth allocated to the uplink signal of another optical-terminating device of the plurality of optical-terminating devices connected to another ground station of the plurality of ground stations having a cell adjacent to the cell where the moving object is positioned.

2. The optical transmission system according to claim 1, further comprising:
- a connection number acquisition unit that acquires information indicating the number of the plurality of optical-terminating devices; and
- an array information generation unit that generates information indicating an array of the plurality of optical-terminating devices according to an arrangement order of the plurality of ground stations,
- wherein the bandwidth allocation calculator calculates the first and second allocation amounts on a basis of the number of the plurality of optical-terminating devices and the array of the plurality of optical-terminating devices.

3. The optical transmission system according to claim 1, further comprising a traveling direction acquisition unit that acquires information indicating a moving direction of the moving object,
- wherein the bandwidth allocation calculator calculates the second allocation amount of the bandwidth which is allocated to the uplink signal of the another optical-terminating device connected to the another ground station having a cell which is positioned in the moving direction from the cell where the moving object is positioned.

4. The optical transmission system according to claim 1, wherein the bandwidth allocation calculator calculates an allocation amount of a bandwidth allocated to the uplink signal of the one optical-terminating device connected to the one ground station having the cell where the moving object is positioned and an allocation amount of a bandwidth allocated to the uplink signal of another optical-terminating device connected to another ground station of the plurality of ground stations having a cell overlapping a portion of the cell where the moving object is positioned, as the first allocation amount.

5. The optical transmission system according to claim 1, wherein the bandwidth allocation calculator subtracts a result obtained by multiplying the number of ground stations positioned at an end among the plurality of ground stations by a bandwidth determined in advance from either or both of the first and second allocation amounts.

6. The optical transmission system according to claim 1, further comprising a downlink frame-processing unit that transmits a signal for making an optical-terminating device of the plurality of optical-terminating devices sleep to the optical-terminating device in which traffic of the uplink signal is not generated.

7. A bandwidth allocation method which is executed by an optical transmission system, the method comprising:
- a step of acquiring an uplink signal from a wireless base station of a moving object which is positioned in a cell of one of ground stations;
- a step of transmitting the uplink signal acquired from the ground stations in a time-division multiplexing manner;
- a step of detecting a traffic amount of the uplink signal transmitted in a time-division multiplexing manner for each of optical-terminating devices; and
- a step of estimating one optical-terminating device of the optical-terminating devices connected to one ground station of the ground stations having a cell where the moving object is positioned on the basis of the traffic amount, and calculating a first allocation amount of a bandwidth allocated to the uplink signal of the one optical-terminating device connected to the one ground station having the cell where the moving object is positioned and a second allocation amount of a bandwidth allocated to the uplink signal of another optical-terminating device of the optical-terminating devices connected to another ground station of the ground stations having a cell adjacent to the cell where the moving object is positioned.

\* \* \* \* \*